(12) United States Patent
Hoffmann et al.

(10) Patent No.: US 8,408,810 B2
(45) Date of Patent: Apr. 2, 2013

(54) CONNECTOR FOR OPTICAL WAVEGUIDES

(75) Inventors: Rita Hoffmann, Rahden (DE); Uwe Foss, Espelkamp (DE)

(73) Assignee: Harting Electronics GmbH (DE)

( * ) Notice: Subject to any disclaimer, the term of this patent is extended or adjusted under 35 U.S.C. 154(b) by 193 days.

(21) Appl. No.: 12/702,973

(22) Filed: Feb. 9, 2010

(65) Prior Publication Data
US 2010/0220959 A1 Sep. 2, 2010

(30) Foreign Application Priority Data

Mar. 3, 2009 (DE) .......... 10 2009 011 388

(51) Int. Cl.
G02B 6/38 (2006.01)
(52) U.S. Cl. ......................................... 385/60
(58) Field of Classification Search .................. None
See application file for complete search history.

(56) References Cited

U.S. PATENT DOCUMENTS

| | | | |
|---|---|---|---|
| 5,157,749 A | 10/1992 | Briggs et al. | 385/60 |
| 5,285,510 A | 2/1994 | Slaney | 385/78 |
| 5,293,582 A | 3/1994 | Beard et al. | 385/78 |
| 6,331,079 B1 | 12/2001 | Grois et al. | 385/53 |
| 6,485,194 B1 | 11/2002 | Shirakawa | 385/78 |
| 6,945,704 B2 | 9/2005 | Yamaguchi | 385/60 |
| 7,357,579 B2 | 4/2008 | Feldner | 385/56 |
| 2002/0076165 A1 | 6/2002 | Childers et al. | 385/78 |

FOREIGN PATENT DOCUMENTS

| | | |
|---|---|---|
| DE | 93 14 172 | 12/1993 |
| DE | 101 14 144 | 2/2002 |
| DE | 103 25 835 | 1/2004 |
| DE | 10 2006 000 702 | 4/2007 |
| DE | 10 2006 019 335 | 10/2007 |

OTHER PUBLICATIONS

German Examination Report issued in German Application Serial No. 10 2009 011 388.6 dated Oct. 7, 2009, 4 pgs.
European Search Report dated May 12, 2010 issued in 10001738.3-1234, (6 pgs).
International Preliminary Report on Patentability; PCT/DE2011/075028, Dated Sep. 25, 2012 (7 pgs).

*Primary Examiner* — Sarah Hahm
(74) *Attorney, Agent, or Firm* — Hayes Soloway P.C.

(57) ABSTRACT

In order to realize an exact contacting of optical waveguides in connectors, the invention proposes a connector for optical waveguides, particularly for being mated and contacted with a mating connector that is equipped with an optoelectric receiver, wherein two optical waveguides are respectively arranged within a ferrule housing in a spring-loaded fashion in individual ferrules and can be axially displaced independently of one another. The ferrule housings are also arranged in a sliding housing that is arranged within a surrounding connector housing such that it can be axially displaced by a certain supplementary travel, namely also in a spring-loaded fashion. This makes it possible to reliably compensate manufacturing-related dimensional tolerances between the ferrule housings and the optoelectric receivers in a mating connector or another adapter.

7 Claims, 4 Drawing Sheets

CONNECTOR FOR OPTICAL WAVEGUIDES

BACKGROUND OF THE INVENTION

1. Field of the Invention

The invention pertains to a connector for optical waveguides, particularly for being mated and contacted with a mating connector that is equipped with an optoelectric receiver.

A thusly designed connector is required for realizing a suggested minimum contact pressure of the optical waveguide to be mated on the optoelectric receiver in the mating connector, as well as for achieving a securely mated position in mating connectors with differing dimensions due to a supplementary travel of the optical waveguides.

2. Description of the Related Art

In individual ferrule housings that are directly inserted into a duplex arrangement of a mating connector equipped with an optoelectric receiver, locking arms that are integrally moulded onto the ferrule housings can be directly interlocked in the housing of the mating connector in a precisely fitted fashion. However, in order to realize a convenient mating process—that also should fulfill the requirements of an environmentally sealed connection—the normal receiver housing mounted on a printed circuit board requires an adapter housing or screw-on housing that can be mated with a correspondingly protected OWG connector housing with ferrule housings contained therein. Since the mating dimensions are changed due to the accommodation of the ferrule housings in an additional connector housing, a correct optical contacting with the same mating connector is no longer ensured. Depending on the design of the mating connectors with the optoelectric receivers or an adapter, it is quite possible that the mating depths differ such that the required minimum contact pressure of the ferrules on the receiver or a "mating ferrule" is not achieved.

SUMMARY OF THE INVENTION

Consequently, the invention is based on the objective of designing a connector for optical waveguides in such a way that an optimal adaptation of the optical waveguides is realized for different mating depths within a mating connector equipped with an optoelectric receiver or within an adapter, namely by means of a housing part that can also be axially displaced within the connector.

This objective is attained in that the connector comprises a connector housing, in which at least one ferrule housing with an optical waveguide embedded in a ferrule is arranged in a sliding housing, wherein the ferrule can be axially displaced by means of a spring arranged in the ferrule housing, and in that the sliding housing is arranged within the surrounding connector housing such that it can be axially displaced by a supplementary travel together with at least one ferrule housing held therein with the aid of an axially acting spring.

The invention therefore pertains to an optical waveguide connector that automatically compensates the different mating depths of mating connectors that are equipped with optoelectric receivers and produced by different manufacturers without special precautions.

This connector is intended, in particular, for producing plug connections under difficult environmental conditions.

The conventional receiver connectors are preferably arranged on a printed circuit board and can be contacted with the optical waveguide connector by means of an adapter housing or screw-on housing. In this case, it is advantageous to use a sliding housing that fulfills the requirements of the Push-Pull concept.

In plug connections between optical waveguides, the optical waveguides held in ferrules should be pressed against one another with a suggested pressure of approximately 5N in order to ensure an optimal transmission of the optical signals.

For this purpose, the individual ferrules are initially fitted into corresponding OWG ferrule housings together with an axially acting spring such that their optical surfaces are pressed against one another with the respective spring pressure at the correct mating depth during the contacting with a mating connector.

If the correct mating depth is not reached when two OWG connectors are interlocked, it may be impossible to transmit the light wave signals under certain circumstances.

The advantages attained with the invention can be seen, in particular, in that the spring-loaded ferrules are fixed in the sliding housing within their ferrule housings such that only the ferrules with the optical waveguides can initially be axially displaced. Furthermore, the sliding housing is supported in the connector housing such that it can be displaced by a certain axial travel, wherein the travel is defined—independently of the interlocked connector housing—by means of a sinuous spring that acts upon the sliding housing.

Consequently, this configuration makes it possible to compensate mating depths that differ by up to approximately 4 mm.

Another advantage is achieved with the design of the connector housing with a sliding sleeve (Push-Pull principle) such that an extremely simple mating process can be realized and the mated connectors are interlocked, wherein the connector housing is also provided with corresponding sealing elements such that this (MG plug connection can also be used under difficult environmental conditions.

The connector housing needs to have a certain minimum length in order to absorb the unavoidable curvature of the optical waveguide within the connector housing during a reduction of the travel of the sliding housing. In this case, it is advantageous to insert a specially designed cable manager into the connector housing, wherein the optical waveguides are guided within said cable manager such that they have a preferred curvature direction when the travel is reduced and a minimum bending radius is always reached.

BRIEF DESCRIPTION OF THE DRAWINGS

One embodiment of the invention is illustrated in the figures and described in greater detail below in which.

DESCRIPTION OF THE PREFERRED EMBODYMENTS

Figure 1:
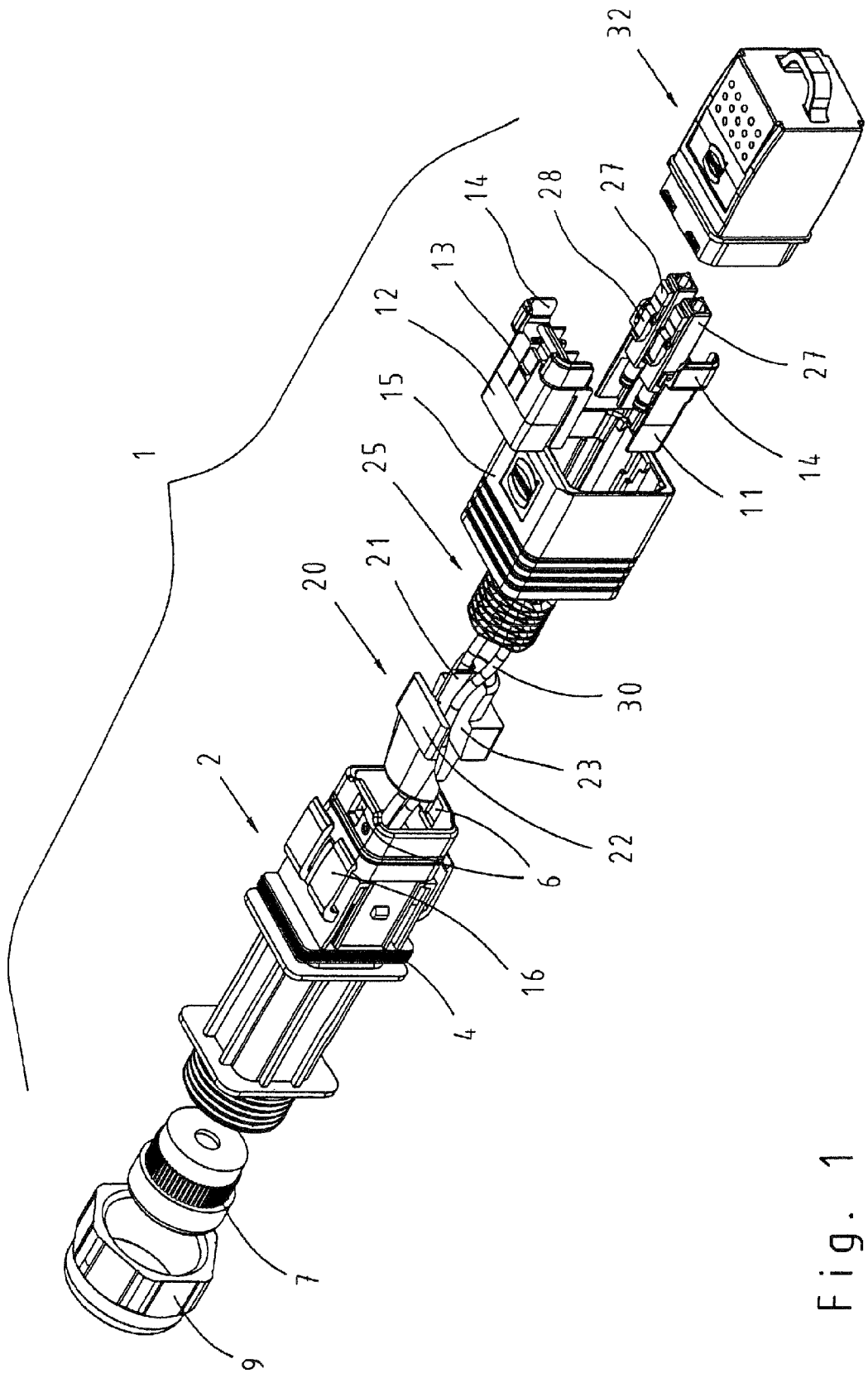
FIG. 1 shows an exploded view of an optical waveguide connector.

FIG. 1 shows an exploded view of a connector 1 for optical waveguides 30 with its individual components.

This figure shows from left to right: a pressure screw 9 with a seal 7 that is required for screwing the not-shown optical waveguides into the connector housing 2 in an environmentally sealed fashion.

The connector housing furthermore contains a cable manager 20 that is described below, a sinuous spring 25 to be inserted into the connector housing 2 and a sliding sleeve 15 for interlocking and unlocking the connector 1 with/from a mating connector 35.

A peripheral sealing lip 4 is provided on the end of the connector housing 2 on the cable side and seals the connector housing against environmental influences together with the surrounding sliding sleeve 15.

This figure furthermore shows a two-part sliding housing 10 with an upper shell half 11 and a lower shell half 12, into which two ferrule housings 27 can be inserted adjacent to one another.

Lastly, a protective cap 32 is provided and can be interlocked with the connector housing 2 on the mating side in order to protect the sensitive optical output surfaces of the optical waveguides 30.

After initially inserting the ferrule housings 27 into the lower shell half 11 and covering the ferrule housings with the upper shell half 12, locking arms 28 that are integrally moulded onto the ferrule housings 27 are locked within the now completed sliding housing 10.

Subsequently, the sliding housing 10 is inserted into the connector housing 2 and interlocked in two corresponding oblong detent openings 6 in the connector housing 2 by means of two locking hooks 13 that are respectively arranged on the lower shell half 11 and on the upper shell half 12, wherein the sliding housing is already slightly pressed against the sinuous spring 25.

The oblong detent openings 6 ultimately define the travel of the sliding housing 15 in the connector housing 3.

Figure 2:
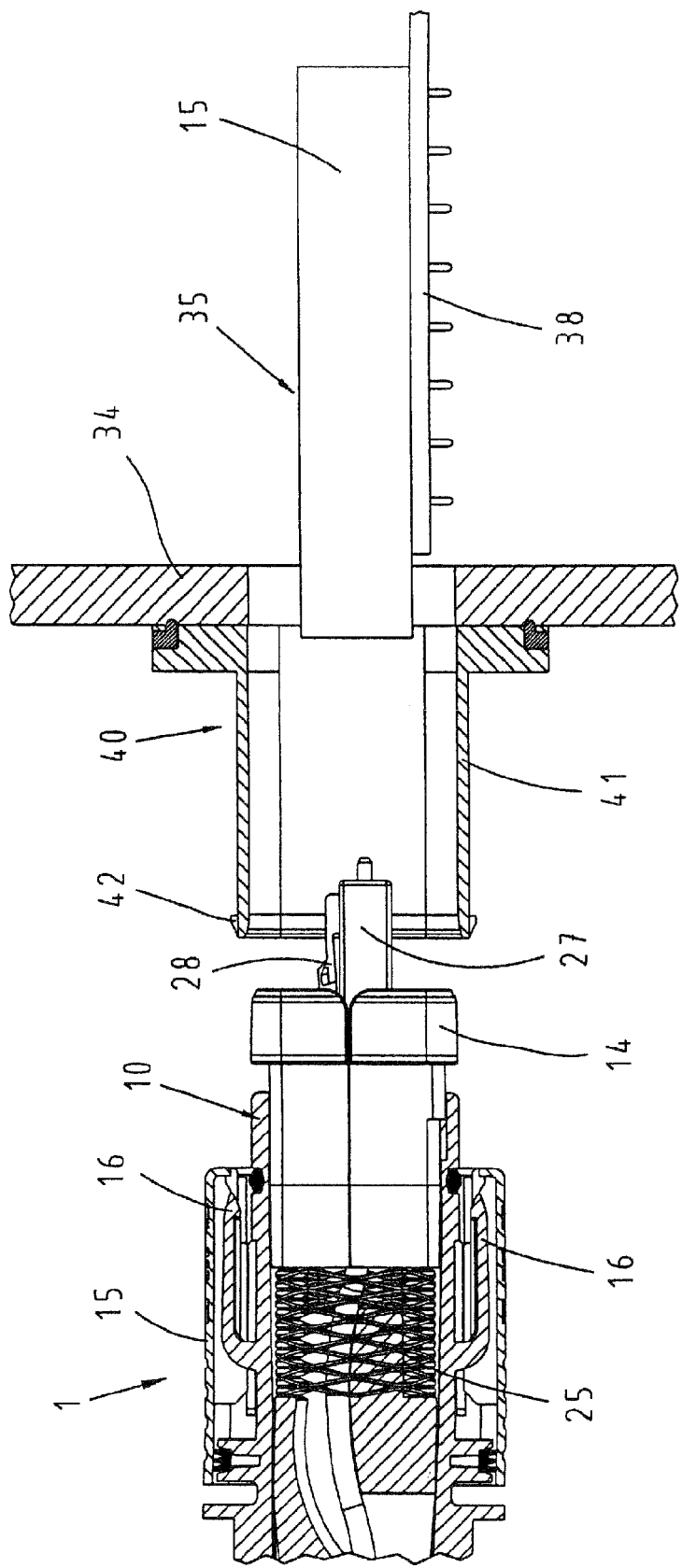
FIG. 2 is a sectional representation of the optical waveguide connector with a mating connector.

FIG. 2 shows a sectional representation of the connector 1 together with a mating connector 35 that features optoelectric receivers 36 and is held on a wall opening of a mounting wall 34 by means of a screw-on housing 40.

The connector is pushed onto the collar-shaped sleeve 41 of the screw-on housing 40 in order to couple the optical waveguides to the optoelectric receivers. During this process, the two lateral collars 14 on the sliding housing 10 act as guide rails within the sleeve 41 of the screw-on housing 40 such that a simple and secure connection with the mating connector 35 is produced.

In this case, the mating connector may also be realized in the form of a coupling for connecting additional optical waveguides.

When the mating process is completed, the locking arms 16 of the sliding sleeve 15 engage on an undercut 42 in the screw-on housing 40.

Although it is required to exactly observe the dimensional accuracy of the screw-on housing 40, onto which the connector 1 is pushed, dimensional tolerances between the screw-on housing 40, the mounting wall 34, the mating connector 35 arranged on a printed circuit board 38 and the optoelectric receivers in the mating connector 35 are unavoidable due to the different manufacturers.

Different mating depths for an optical waveguide connector 1 may also result from different geometric arrangements of the optoelectric receivers in the mating connector 35 such that a correct optical coupling is not readily ensured.

This is prevented by providing a sliding housing 10 that can be axially displaced in the connector housing 2 by a certain travel together with the ferrule housings 27 held therein.

Consequently, a supplementary travel 18 is available in addition to the axial travel of the ferrules within the ferrule housings 27 such that the output surfaces of the optical waveguides 30 can be securely contacted with the optoelectric receivers 36 in the mating connector 35.

Figure 3:
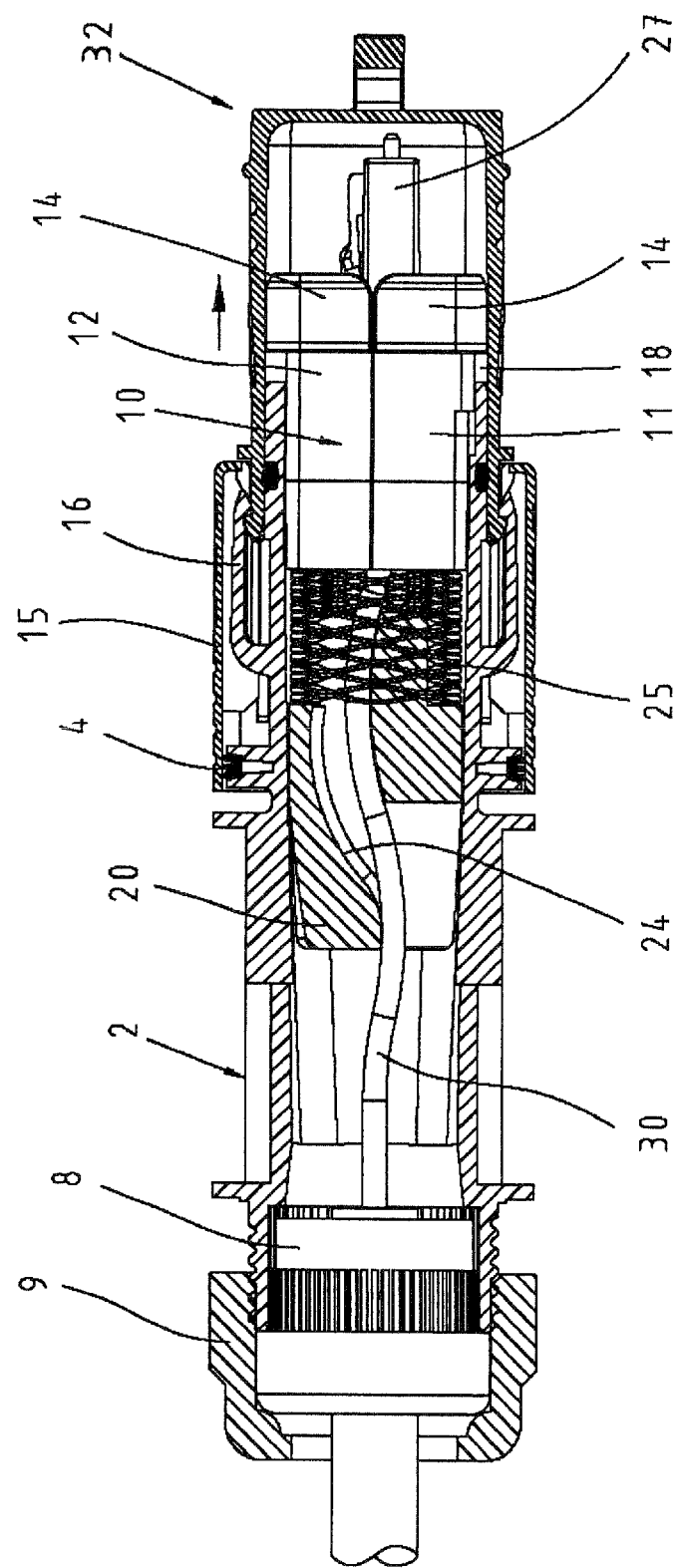
FIG. 3 is a sectional representation of the optical waveguide connector with normally aligned optical waveguides.
Figure 4:
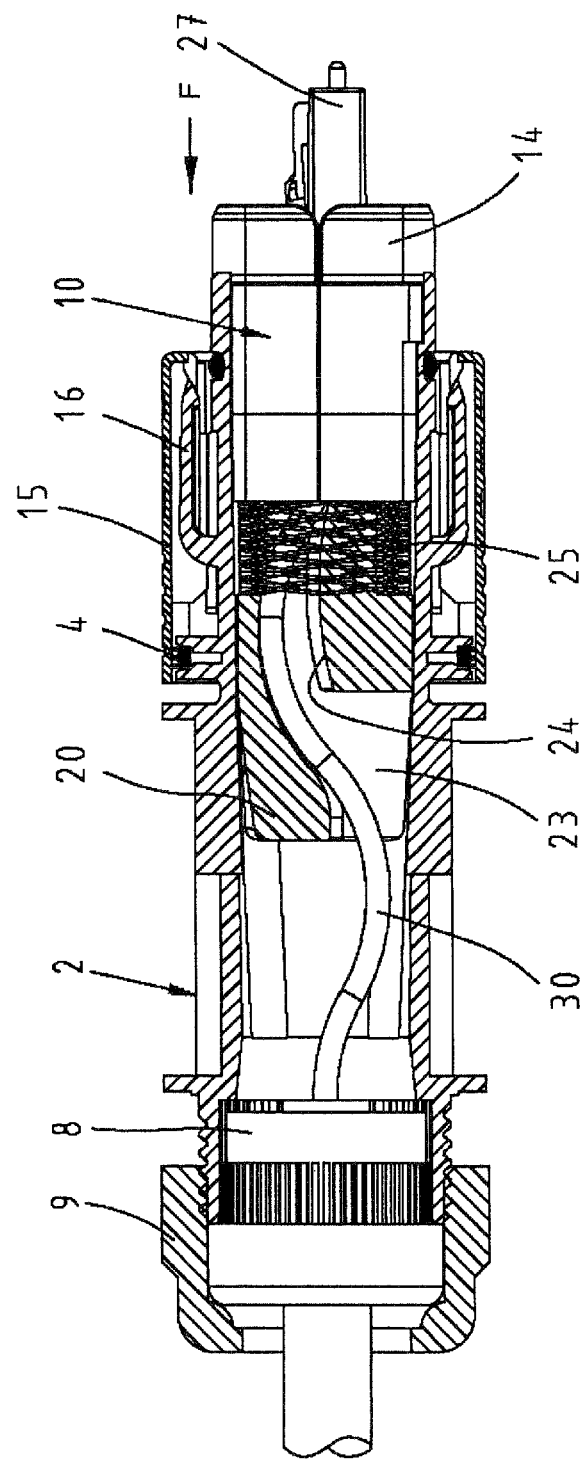
FIG. 4 is a sectional representation of the optical waveguide connector with curved optical waveguides.

FIG. 3 and FIG. 4 show the connector 1 with the connector housing 2 and the optical waveguides 30 contained therein, namely in the form of a vertical section referred to the illustration in FIG. 1.

FIG. 3 also shows how a separate protective cap 32 is interlocked on the connector housing 2.

FIG. 3 shows how the sliding housing 10 is completely pressed into the front position (travel 18 is visible) referred to the mating direction by the sinuous spring 25, wherein the sliding housing 15 in FIG. 4 is pushed into the rear position due to an external pressure (indicated with F1) acting thereupon.

In this case, the optical waveguide 30 has a relatively significant curvature (within the scope of technical reasonability) in the interior of the connector housing 3.

In order to predetermine this curvature to a certain extent, a specially designed cable manager 20 is inserted into the connector housing 2.

The cable manager 20 has an oblong cylindrical shape and is positioned within the connector housing 2 in such a way that a first half of slightly conical shape points in the direction of the cable seal 7 and a second half of cylindrical shape extends into the sinuous spring 25.

A square collar 22 is formed between the two halves, wherein one side contacts a (not-shown) rear stop in the connector housing 2 while the other side of the collar 22 contacts the sinuous spring 23.

In addition, two axially extending longitudinal openings 23 are formed in the cable manager 20 by a central partition wall 21. One respective optical waveguide 30 can be laterally inserted into these longitudinal openings 23 (in this respect, see also FIG. 1).

In this case, the optical waveguides 30 are guided in the longitudinal openings 23 by means of correspondingly curved sections 24 such that they assume a certain defined curvature when the sliding housing 10 is pushed back and therefore make it possible to reduce the length within the connector housing in accordance with the travel (18) of the sliding housing 10.

What is claimed is:

1. And optical waveguide connector for mating and contacting with a mating connector that is equipped with an optoelectric receiver, comprising:
   a connector housing, in which at least one ferrule housing with an optical waveguide embedded in a ferrule is arranged in a sliding housing,
   wherein the ferrule can be axially displaced by a spring arranged in the ferrule housing,
   wherein the sliding housing is arranged within the connector housing such that the sliding housing can be axially displaced by a supplementary travel together with at least one ferrule housing held therein with the aid of an axially acting spring, and
   wherein the optical waveguide is fixed with a seal and a pressure screw into the connector housing in an environmentally sealed fashion.

2. The connector according to claim 1, wherein the spring that is arranged in the connector housing and axially acts upon the sliding housing is a sinuous spring.

3. The connector according to claim 1, wherein the connector housing is surrounded by an axially displaceable sliding sleeve.

4. The connector according to claim 1, further comprising a cable manager arranged within the connector housing, said cable manager having two lateral longitudinal openings for accommodating the optical waveguides, wherein a curvature of the optical waveguides resulting from travel of the sliding housing is managed within the cable manager.

5. The connector according to claim 4, wherein the two lateral longitudinal openings of the cable manager are formed at least partially within a square collar having inner curved walls separated by a center wall.

6. The connector according to claim 5, wherein the curved walls of the cable manager effectuate a defined deflection of the optical waveguides during an axial displacement of the sliding housing.

7. The connector according to claim 1, wherein the axial travel of the sliding housing within the connector housing is constrained by the length of detent openings in the connector housing.

\* \* \* \* \*